US011001112B2

(12) United States Patent
Weglin et al.

(10) Patent No.: US 11,001,112 B2
(45) Date of Patent: May 11, 2021

(54) SYSTEM FOR WHEEL SUSPENSION OF A VEHICLE

(71) Applicant: Volvo Car Corporation, Gothenburg (SE)

(72) Inventors: Joakim Weglin, Hisings Backa (SE); Kjell Sjosten, Vastra Frolunda (SE); Åke Malm, Alvangen (SE)

(73) Assignee: Volvo Car Corporation, Gothenburg (SE)

( * ) Notice: Subject to any disclaimer, the term of this patent is extended or adjusted under 35 U.S.C. 154(b) by 120 days.

(21) Appl. No.: 16/174,811

(22) Filed: Oct. 30, 2018

(65) Prior Publication Data

US 2019/0135063 A1 May 9, 2019

(30) Foreign Application Priority Data

Nov. 7, 2017 (EP) .................................... 17200229

(51) Int. Cl.
*B60G 3/20* (2006.01)
*B60G 11/08* (2006.01)
(Continued)

(52) U.S. Cl.
CPC ............... *B60G 3/20* (2013.01); *B60G 7/001* (2013.01); *B60G 11/08* (2013.01); *B60G 11/14* (2013.01);
(Continued)

(58) Field of Classification Search
CPC .......... B60G 2206/011; B60G 2206/60; B60G 2206/604; B60G 2206/8101;
(Continued)

(56) References Cited

U.S. PATENT DOCUMENTS 2,705,660 A * 4/1955 Giacosa ................. B60G 99/00
296/204
3,694,890 A * 10/1972 Arning ..................... B60G 3/20
29/428
(Continued)

FOREIGN PATENT DOCUMENTS

DE 4322717 A1 1/1995
EP 1837268 A2 * 9/2007 ......... B60G 21/0551
(Continued)

OTHER PUBLICATIONS

Apr. 30, 2018 European Search Report issue on International Application No. EP17200229.

*Primary Examiner* — Laura Freedman
(74) *Attorney, Agent, or Firm* — Clements Bernard Walker; Christopher L. Bernard (57) ABSTRACT

A wheel suspension of a vehicle intended to extend in a transversal direction of the vehicle in association with first and second wheels arranged on opposite sides of the vehicle, comprising: a subframe unit provided with a set of attachment points for attachment of the subframe unit to a vehicle body structure, wherein the subframe unit comprises a cross member extending along the subframe unit in a transversal direction of the vehicle when the subframe unit is attached to the vehicle; at least a first link member arranged on each side of the subframe unit, wherein each first link member is arranged to connect a corresponding wheel or wheel supporting element with the subframe unit via a pivoted connection; and a spring arrangement arranged to act onto each of the first link members so as to provide for a spring suspension of the first and second wheels.

12 Claims, 9 Drawing Sheets

(51) Int. Cl.
  *B60G 11/14* (2006.01)
  *B60G 11/27* (2006.01)
  *B60G 7/00* (2006.01)
  *B62D 21/11* (2006.01)
  *B62D 65/12* (2006.01)

(52) U.S. Cl.
  CPC .............. B60G 11/27 (2013.01); B62D 21/11 (2013.01); B62D 65/12 (2013.01); *B60G 2200/144* (2013.01); *B60G 2200/18* (2013.01); *B60G 2202/114* (2013.01); *B60G 2202/12* (2013.01); *B60G 2202/152* (2013.01); *B60G 2204/121* (2013.01); *B60G 2204/124* (2013.01); *B60G 2204/126* (2013.01); *B60G 2204/15* (2013.01); *B60G 2206/011* (2013.01); *B60G 2206/60* (2013.01); *B60G 2206/8101* (2013.01); *B60G 2206/91* (2013.01)

(58) Field of Classification Search
  CPC ........................ B60G 2206/91; B60G 2206/99; B60G 11/08; B60G 11/14; B60G 11/27; B60G 2202/114; B60G 2202/12; B60G 2202/152; B60G 2204/121; B60G 2204/124; B60G 2204/1244; B60G 2204/126; B60G 2204/15; B60G 3/04; B60G 3/06; B60G 3/20; B60G 7/001; B60G 2200/142; B60G 2200/144; B60G 2200/18; B62D 21/11; B62D 65/12
  See application file for complete search history.

(56) References Cited

U.S. PATENT DOCUMENTS

| | | | | |
|---|---|---|---|---|
| 4,057,120 A | * | 11/1977 | Roethlisberger | B60G 3/24 180/263 |
| 4,811,970 A | * | 3/1989 | Cassese | B60G 7/02 180/295 |
| 4,848,789 A | * | 7/1989 | Timoney | B60G 3/20 280/124.139 |
| 4,869,527 A | * | 9/1989 | Coddens | B60G 7/02 280/86.753 |
| 5,833,026 A | * | 11/1998 | Zetterstrom | B60G 3/202 180/360 |
| 6,398,262 B1 | * | 6/2002 | Ziech | B60G 3/20 180/311 |
| 6,588,779 B2 | * | 7/2003 | Sandahl | B60G 3/20 280/124.135 |
| 6,755,429 B1 | | 6/2004 | Buchwitz et al. | |
| 7,500,688 B2 | * | 3/2009 | Mullican | B60G 9/00 267/23 |
| 7,559,403 B2 | * | 7/2009 | Schmitz | B60G 3/20 180/344 |
| 7,926,846 B2 | * | 4/2011 | Tanaka | B60G 3/20 280/781 |
| 7,959,170 B2 | * | 6/2011 | Mauz | B60G 3/20 280/124.109 |
| 7,959,174 B2 | * | 6/2011 | Mullican | B60G 9/00 267/221 |
| 8,025,313 B2 | * | 9/2011 | Tanaka | B60G 3/202 180/311 |
| D666,949 S | * | 9/2012 | West | D12/160 |
| 8,678,410 B2 | * | 3/2014 | Sjoesten | B60G 17/0275 280/124.171 |
| 8,943,696 B2 | * | 2/2015 | Oprea | B60G 9/025 280/124.1 |
| 8,967,639 B2 | * | 3/2015 | Conaway | B60G 9/02 280/86.5 |
| 9,073,400 B2 | * | 7/2015 | Perri | B60G 11/08 |
| 9,221,496 B2 | * | 12/2015 | Barr | B62D 21/11 |
| 9,649,923 B2 | * | 5/2017 | Perlo | B60K 17/358 |
| 2004/0222030 A1 | | 11/2004 | Szalony et al. | |
| 2012/0326410 A1 | | 12/2012 | West et al. | |

FOREIGN PATENT DOCUMENTS

| | | | | |
|---|---|---|---|---|
| FR | 2684347 A1 | | 6/1993 | |
| FR | 2725393 A1 | * | 4/1996 | ............ B62D 21/11 |
| FR | 2919230 A1 | | 1/2009 | |
| GB | 1499696 A1 | | 2/1978 | |
| JP | 10167109 A | * | 6/1998 | |
| JP | 11059152 A | * | 3/1999 | |
| JP | 2000272314 A | * | 10/2000 | |
| WO | 9829292 A1 | | 7/1998 | |
| WO | 0226548 A1 | | 4/2002 | |

\* cited by examiner

SYSTEM FOR WHEEL SUSPENSION OF A VEHICLE

CROSS-REFERENCE TO RELATED APPLICATION

The present patent application/patent claims the benefit of priority of co-pending European Patent Application No. 17200229.7, filed on Nov. 7, 2017, and entitled "SYSTEM FOR WHEEL SUSPENSION OF A VEHICLE," the contents of which are incorporated in full by reference herein.

TECHNICAL FIELD

This invention relates to a system for wheel suspension of a vehicle. In particular, the invention relates to wheel suspension of the rear wheels of a vehicle. The invention also relates to a vehicle provided with such a system and to a method for manufacturing such a system.

BACKGROUND OF THE INVENTION

A rear wheel suspension system for a passenger car typically includes a subframe attached to a vehicle body support structure, various link members for connecting a wheel (or rather a wheel supporting element) to the subframe via a pivoted attachment, and a spring system that acts between a link member and the subframe or the vehicle body structure. The springs may be of different types, such as coil springs, leaf springs and air springs. Examples of rear wheel suspension subframes for vehicles are disclosed in e.g. US2004/0222030 and U.S. Pat. No. 6,755,429.

Production of cars usually involves the use of platforms where several car models share some general features, such as vehicle body structure and wheel base, while more noticeable components may differ. Subframes typically form part of the platform and fit to all models.

Different spring systems may be advantageous or desired for vehicles that are based on the same platform. If the spring system is a separate component independent of the subframe or other parts of the platform this is no particular issue. If the spring system on the other hand is arranged onto or forms part of the subframe, or if the spring system at least has an effect on the design of the subframe, a choice of springs can be provided by using a set of different subframes, each of which being provided with or adapted to a particular spring system. However, handling, storing and transportation of a variety of subframes is complex and requires large storage areas, i.e. it complicates production and impairs the production cost efficiency.

This invention addresses the problem related to vehicle production efficiency in cases where the choice of spring system for the wheel suspension has an effect on the design of the suspension subframe.

SUMMARY OF THE INVENTION

An object of this invention is to provide a wheel suspension subframe that is adaptable to different spring systems and that makes platform based production of vehicles more flexible and efficient compared to conventional subframes. This object is achieved by the subframe system defined by the technical features contained in the claims. The dependent claims contain advantageous embodiments, further developments and variants of the invention.

The invention concerns a system for wheel suspension of a vehicle, wherein the system is intended to extend in a transversal direction of the vehicle in association with first and second wheels arranged on opposite sides of the vehicle, wherein the system comprises: a subframe unit provided with a set of attachment points for attachment of the subframe unit to a vehicle body structure, wherein the subframe unit comprises a cross member extending along the subframe unit in a transversal direction of the vehicle when the subframe unit is attached to the vehicle; at least a first link member arranged on each side of the subframe unit, wherein each first link member is arranged to connect a corresponding wheel or wheel supporting element with the subframe unit via a pivoted connection; and a spring arrangement arranged to act onto each of the first link members so as to provide for a spring suspension of the first and second wheels.

The invention is characterized in that the spring arrangement is arranged onto the cross member so as to act between the cross member and the first link member, and in that the cross member forms a separate component that is attachable to the subframe unit in a separate production step before attachment of the subframe unit to the vehicle.

Thereby it becomes possible to make use of a "base subframe unit" that fits to the body floor of all vehicles produced on the same platform. Handling and supply of different complete subframes can thus be avoided as it becomes sufficient to provide variants of the cross members/transversal beams that are already equipped with the spring arrangement (typically coil spring, air spring or leaf spring). Cross members occupy less space and are easier to transport than complete subframes so the production becomes less complex. A further advantage of using a single base subframe is a more cost efficient high volume production (compared to the production of different variants of complete subframes).

In an embodiment of the invention the cross member is detachably attachable onto the subframe unit. Preferably, the cross member is attached by means of bolts. Although the cross member might be welded onto the subframe unit it is an advantage if the cross member is detachable in case the spring arrangement is to be replaced because it is broken or another type of spring is desired. That the cross member is detachably attachable onto the subframe unit means that the cross member does not form part of an integral subframe structure, such as a cast structure.

In an embodiment of the invention the system comprises a first cross member provided with a spring arrangement of a first type and a second cross member provided with a spring arrangement of a second type that is different from the first type, wherein only one of the first and second cross members is attached to the subframe unit. Preferably, the spring arrangements of the first and second types are selected from the group comprising leaf spring, coil spring and air spring. The system may of course comprise cross members of all three types, and even further types. That the system comprises a plurality of cross members with spring arrangements of different types clarifies further that the cross member forms a separate and, at least if e.g. bolted to the subframe unit, interchangeable component that can be selected and attached to the subframe unit.

In an embodiment of the invention the subframe unit comprises first and second side members connected to each end portion of the cross member. The attachment points for attachment of the subframe unit to the vehicle body structure may be arranged on the first and second side members. The side members may be somewhat U-shaped with the convex parts facing each other (and thus facing a longitudinal centre line of the vehicle) and with the attachment points arranged on the legs of the U.

In an embodiment of the invention the subframe unit comprises a connecting member that extends along the subframe unit in the transversal direction of the vehicle when the subframe unit is attached to the vehicle, and wherein the connecting member is connected to the first and second side members so as to hold the first and second side members in place before attaching the cross member. The connecting member and the two side members form the "base subframe unit" mentioned above. Preferably, these parts are cast so as to form one integral unit. This provides for a cost efficient production and easy handling.

The connecting member may extend substantially in parallel with the cross member. Typically, the connecting member may be arranged so as to be positioned in front of, or rear of, the cross member in relation to the vehicle when the cross member is attached to the subframe unit and the subframe unit is attached onto the vehicle.

In an embodiment of the invention the system comprises first link members of at least two different types adapted to different spring arrangements. For instance, a particular first link member may fit to a coil spring and an air spring but not to a leaf spring. The link members can typically be attached to (and detached from) the subframe unit after having attached the subframe unit to the vehicle.

The system may comprise a second link member arranged on each side of the subframe unit, wherein each second link member is arranged to connect a corresponding wheel or wheel supporting element with the subframe unit via a further pivoted connection. The first link member may form a lower link member and the second link member may form an upper link member.

In an embodiment of the invention the system is a rear wheel suspension system intended to be arranged between left and right rear wheels of the vehicle. The rear wheels may or may not be driving wheels. Wheel suspensions for front wheels typically have another structure.

The invention also concerns a vehicle comprising a wheel suspension system of the above type.

The invention also concerns a method for manufacturing of a system for wheel suspension of a vehicle, wherein the method comprises the steps of:

providing a subframe unit configured to be attachable to a vehicle body structure between first and second wheels arranged on opposite sides of the vehicle, and further being configured to receive a cross member provided with a spring arrangement for spring suspension of the first and second wheels;

providing at least a first and a second cross member configured to be attached to the subframe unit, wherein the first cross member is provided with a spring arrangement of a first type and the second cross member is provided with a spring arrangement of a second type that is different from the first type; and selecting either the first or the second cross member and attaching the selected cross member onto the subframe unit.

In an embodiment of the method it further comprises the step of attaching the subframe unit with the selected cross member to the vehicle.

BRIEF DESCRIPTION OF DRAWINGS

In the description of the invention given below reference is made to the following figure, in which.

DESCRIPTION OF EXAMPLE EMBODIMENTS OF THE INVENTION

Figure 1:
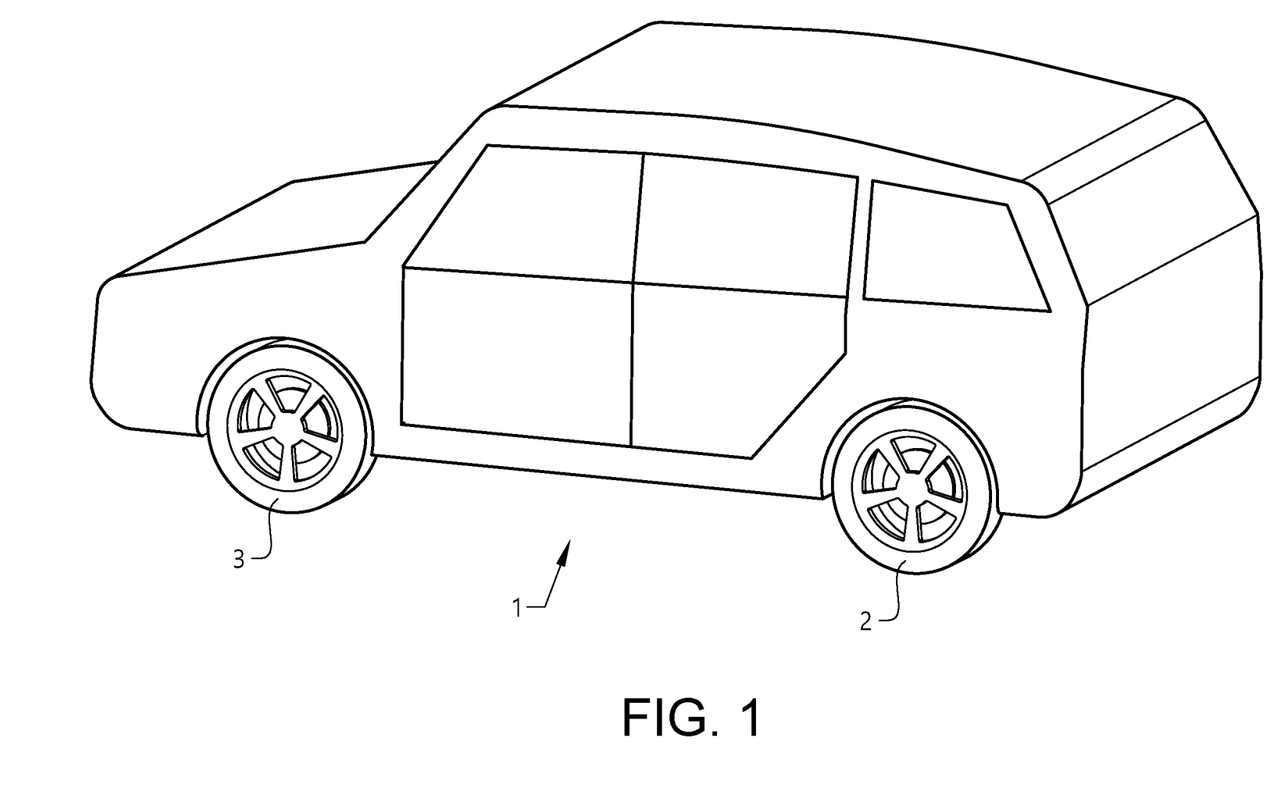
FIG. 1 shows, in a schematic view, a vehicle provided with an embodiment of a system for wheel suspension according to the invention.
Figure 2:
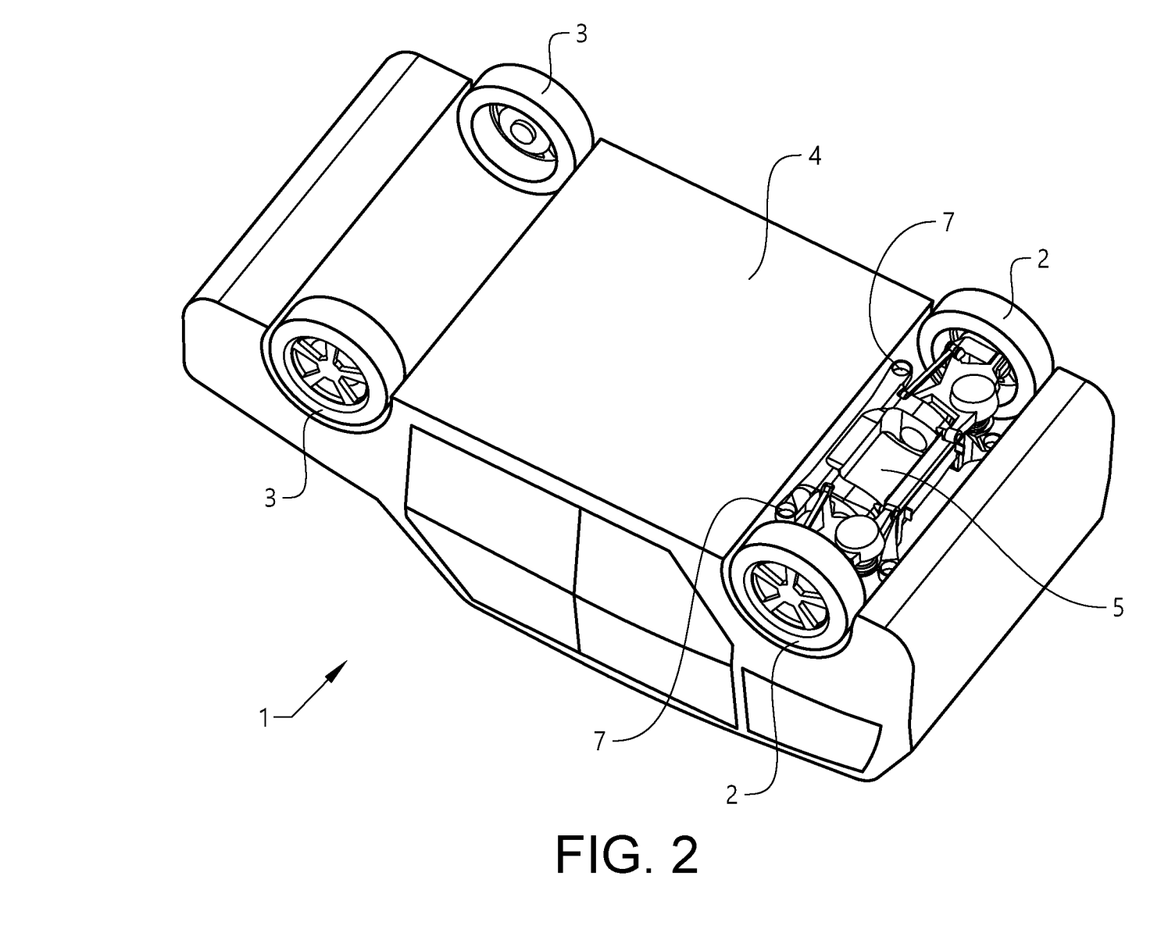
FIG. 2 shows an underside of the vehicle of FIG. 1.
Figure 3:
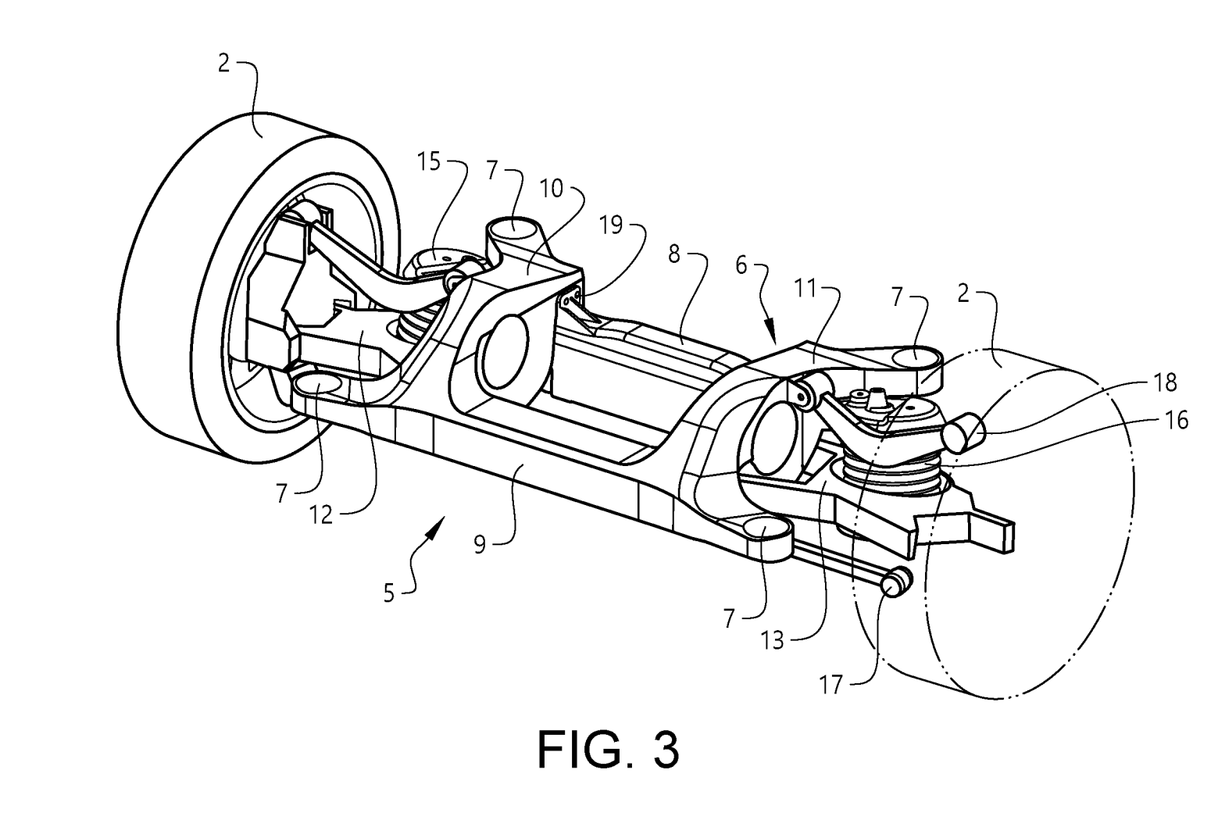
FIG. 3 shows, in a perspective view, a front and upper side of the first embodiment of the wheel suspension system.
Figure 4:
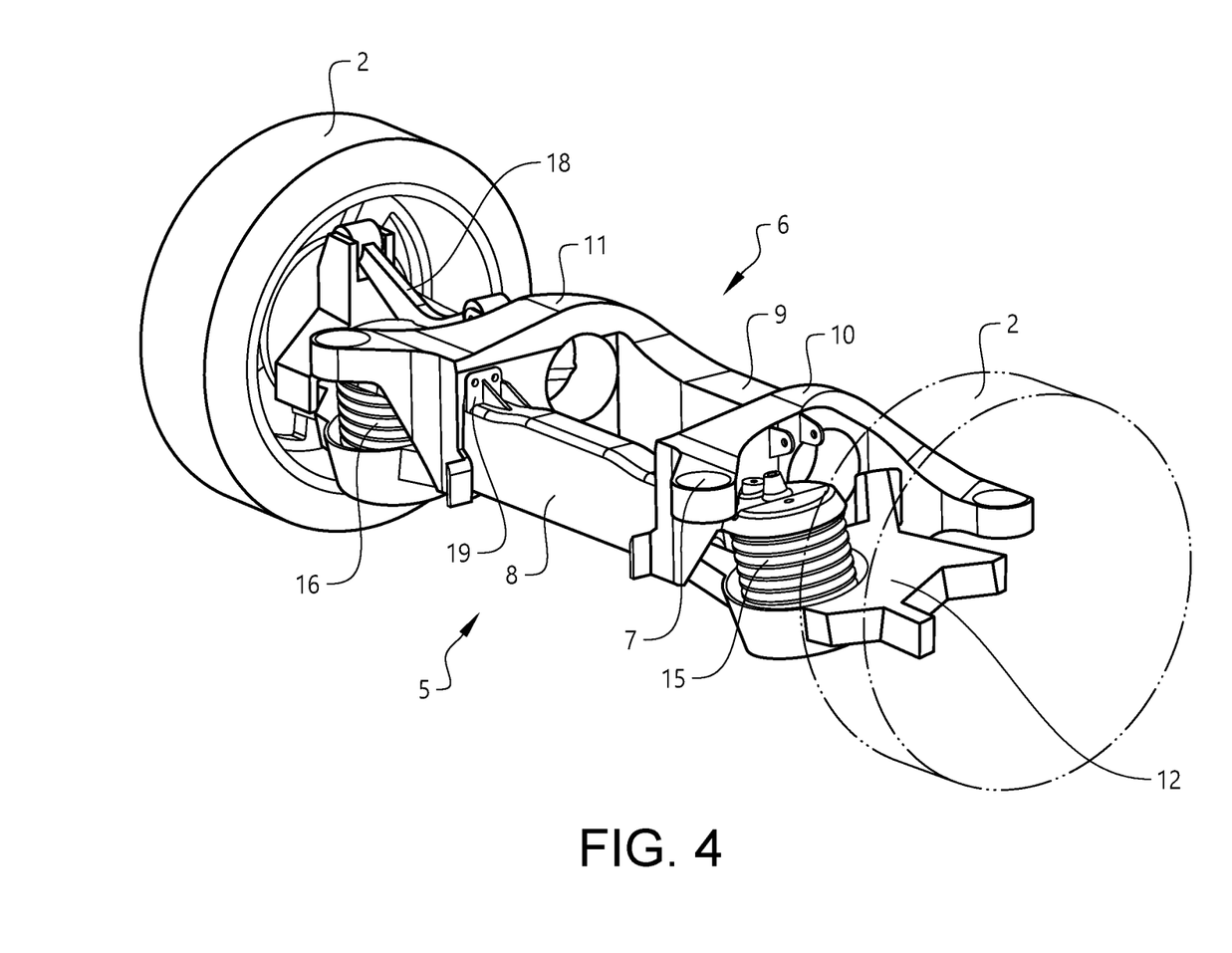
FIG. 4 shows, in a perspective view, a rear and upper side of the first embodiment of the wheel suspension system.

FIG. 1 shows a vehicle 1 provided with a pair of rear wheels 2 and a pair of front wheels 3. FIG. 2 shows the underside of the vehicle 1. The vehicle 1, including its body structure 4, is only shown schematically. As shown in FIG. 2, an embodiment of the system for wheel suspension 5 extends in a transversal direction of the vehicle 1 between the two rear wheels 2 arranged on opposite sides of the vehicle 1. The suspension of the front wheels 3 is configured in a different way and is not shown in the figures.

The exemplified system is shown in different views in FIGS. 3-6. The system 5 comprises a subframe unit 6 provided with a set of attachment points 7 for attachment of the subframe unit 6 to the vehicle body structure 4 (see FIG. 2). The exemplified subframe unit 6 comprises two transversal beams in the form of a first cross member 8 and a connecting member 9 (a front cross member) extending in parallel with each other (with the connecting member 9 in front of the first cross member 8) and along the subframe unit 6 in a transversal direction of the vehicle 1 when the subframe unit 6 is attached to the vehicle 1.

Figure 5:
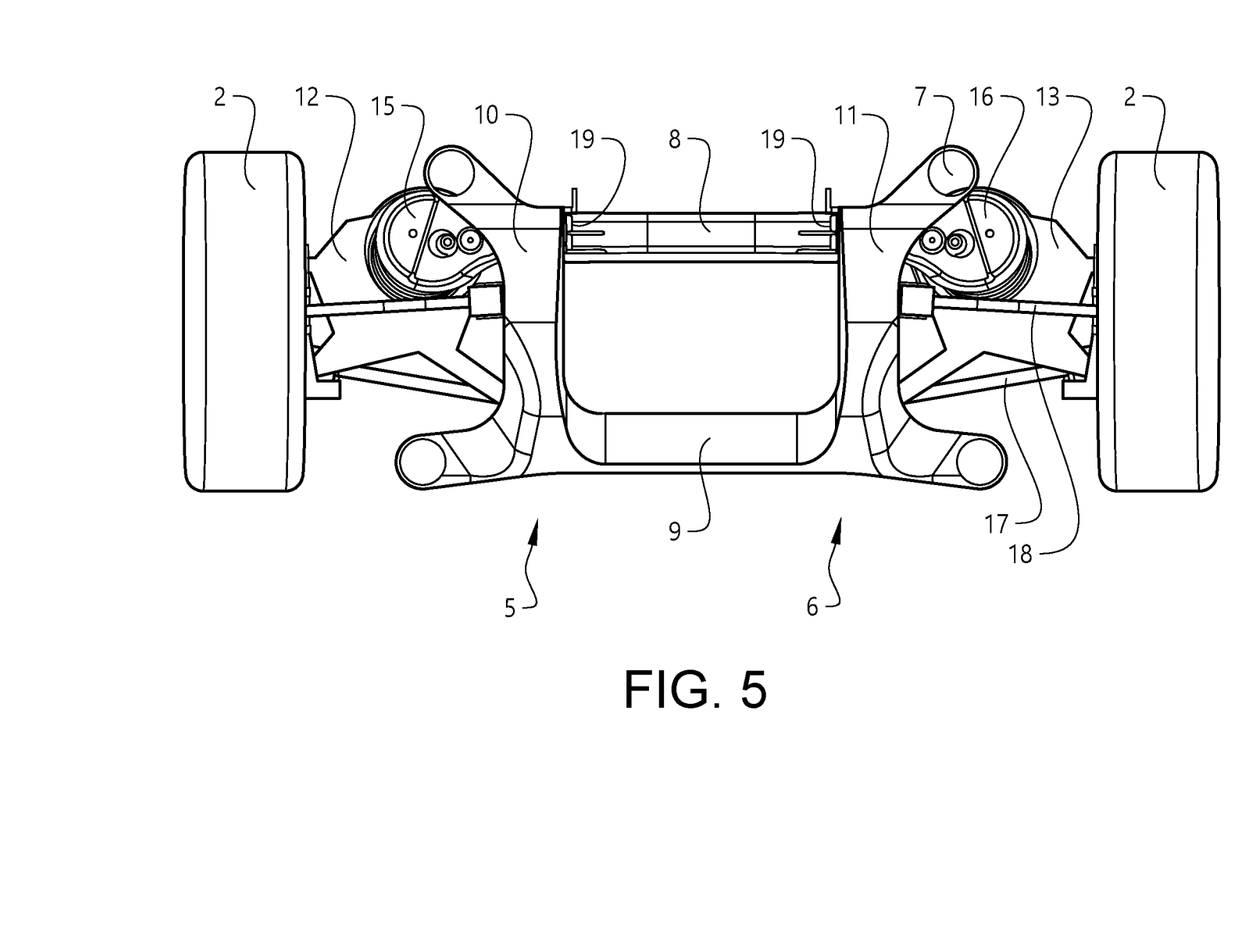
FIG. 5 shows a top view of the first embodiment of the wheel suspension system.
Figure 6:
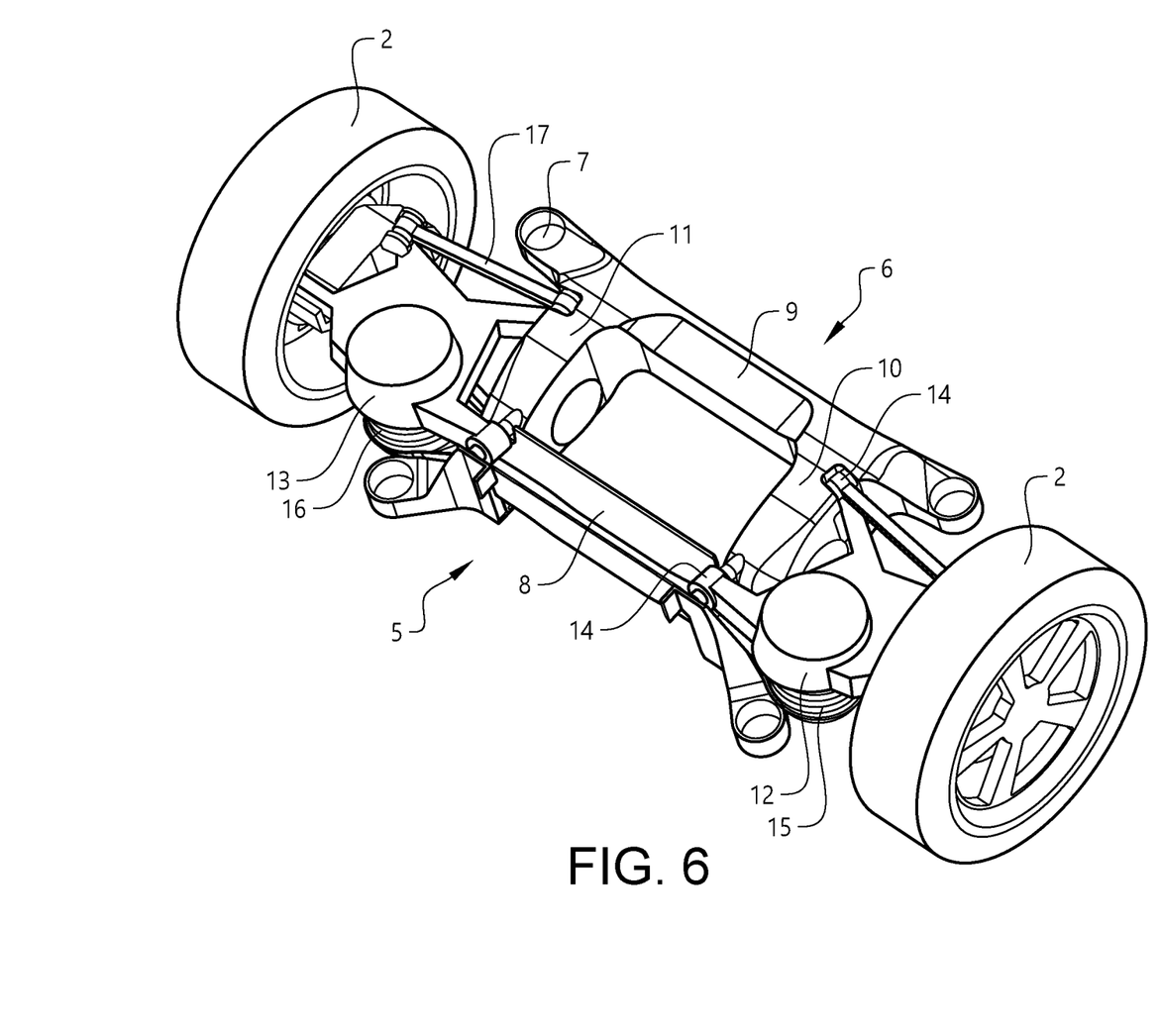
FIG. 6 shows, in a perspective view, a rear and lower side of the first embodiment of the wheel suspension system.

The subframe unit 6 further comprises first and second side members 10, 11, each side member being connected to corresponding end portions of both the first cross member 8 and the connecting member 9 (see FIG. 5). The attachment points 7 for attachment of the subframe unit 6 to the vehicle body structure 5 are arranged on the first and second side members 10, 11. The side members 10, 11 are somewhat U-shaped with the convex parts facing each other and thus facing a longitudinal centre line of the vehicle. The attachment points 7 are arranged on the legs of the U-shaped side members 10, 11.

The connecting member 9 and the two side members 10, 11 form in this case a cast integral unit that in turn forms the "base subframe unit" mentioned above.

The system 5 further comprises a first link member 12, 13 arranged on each side of the subframe unit 6 (see FIG. 5). Each first link member 12, 13 is arranged to connect a corresponding wheel 2 or wheel supporting element with the subframe unit 6 via a pivoted connection 14 (see FIG. 6). Further pivoted link members 17, 18 are provided on each side of the subframe unit 6.

A spring arrangement in the form of first and second air springs 15, 16 is arranged to act onto each of the first link members 12, 13 so as to provide for a spring suspension of the first and second wheels 2. The air springs 15, 16 are arranged onto the first cross member 8 at each end thereof so as to act between the cross member 8 and the first link member 12, 13.

The first cross member 8 forms a separate component that is attachable to the subframe unit 6 in a separate production step before attachment of the subframe unit 6 to the vehicle 1. In the example shown the first cross member 8 is detachably attachable to the subframe unit 6 via bolt connection arrangement 19. The bolt connection arrangement 19 can be arranged in different ways.

Figure 7:
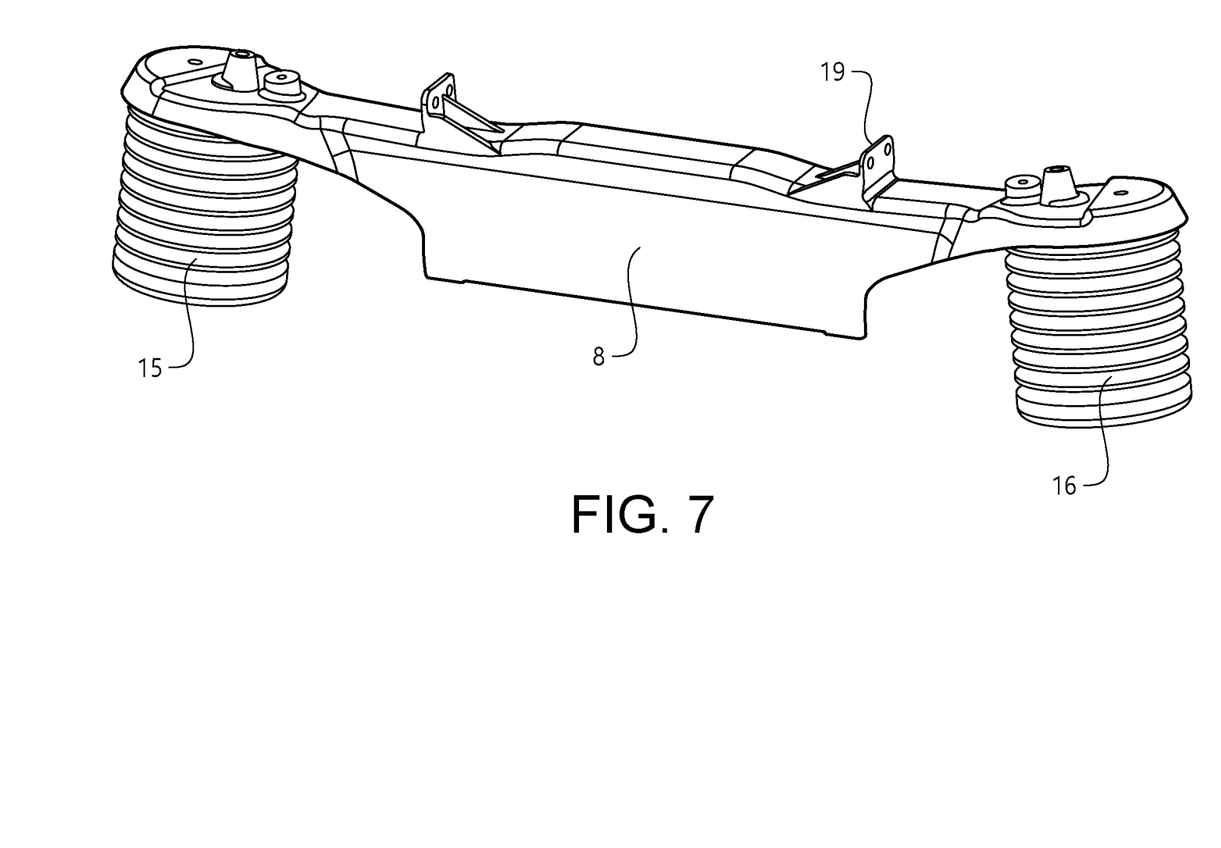
FIG. 7 shows a first a first cross member provided with a spring arrangement of a first type.

FIG. 7 shows the first cross member 8 provided with the two air springs 15, 16 and means for establishing the bolt connection arrangement 19 to the subframe unit 6. The air springs 15, 16 form a spring arrangement of a first type.

Figure 8:
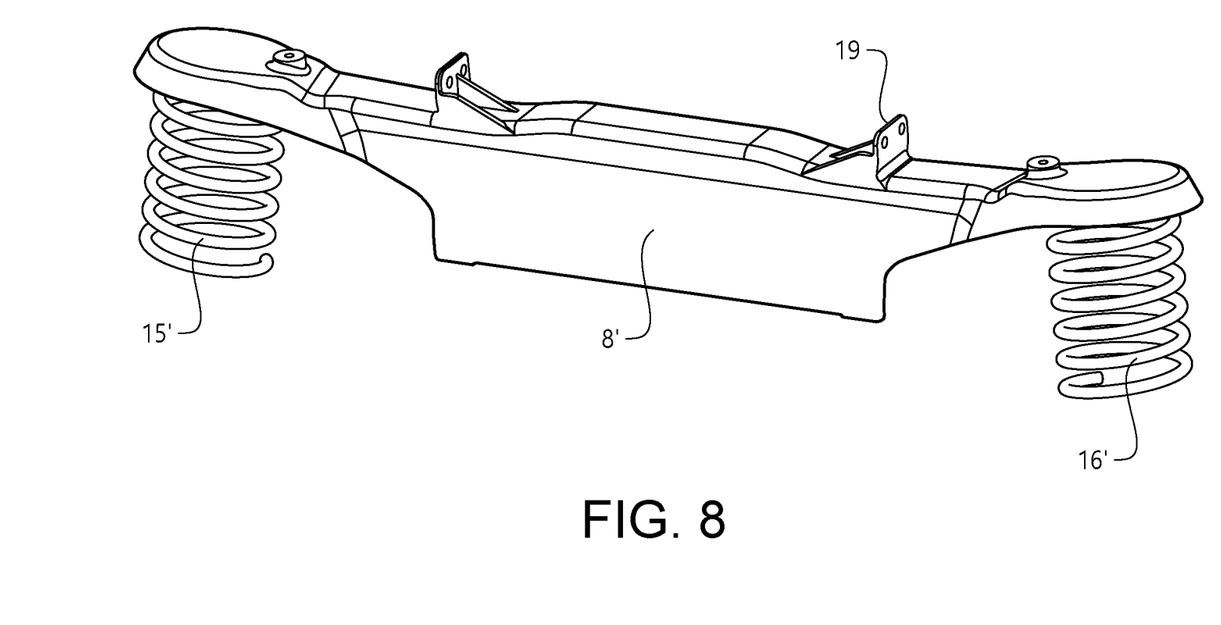
FIG. 8 shows a second cross member provided with a spring arrangement of a second type.

FIG. 8 shows a second cross member 8' provided with a spring arrangement of a second type in the form of first and second coils springs 15', 16'.

Figure 9:
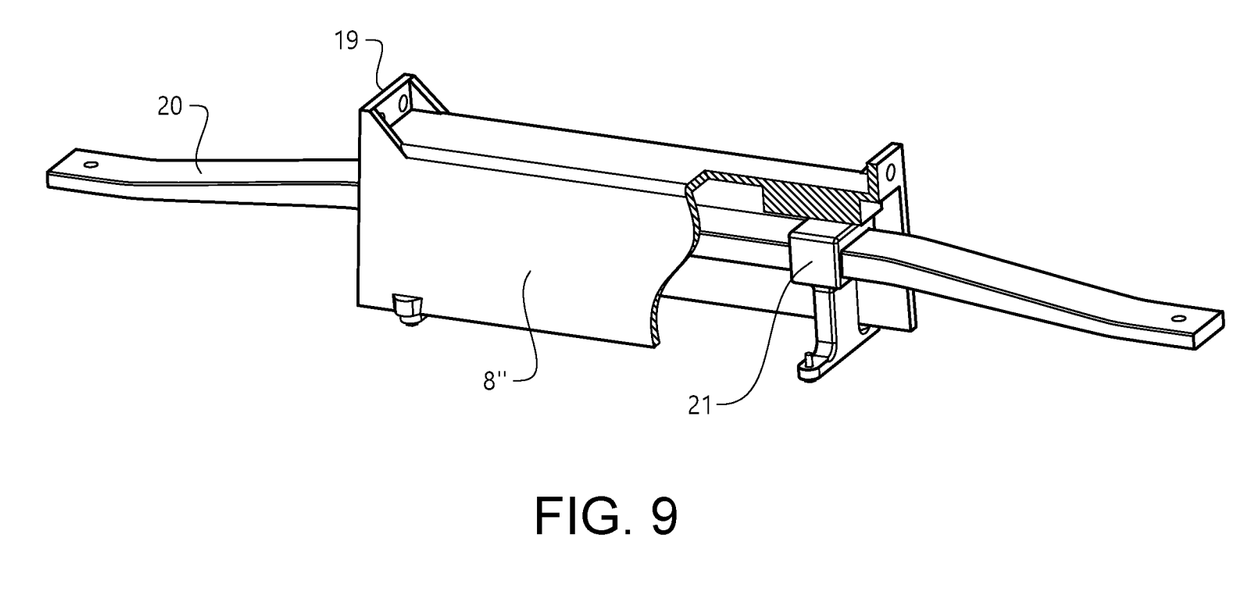
FIG. 9 shows a third cross member provided with a spring arrangement of a third type.

FIG. 9 shows a third cross member 8" provided with a spring arrangement of a third type in the form of a leaf spring 20 attached to the third cross member 8" by means of rubber bushings 21.

All first to third cross members 8, 8', 8" are arranged in a similar way with regard to the means for establishing the bolt connection arrangement 19 to the subframe unit 6, which means that any of the three cross members 8, 8', 8" can be selected and fastened to the subframe unit 6. The same first link member 12, 13 may be used for the air spring and coil spring versions of the cross member 8, 8". Typically, a particular first link member 12, 13 with somewhat adapted shape is used for the leaf spring 20, which has a different shape at its end portions compared to the shape of the air/coil spring.

Any of the three types of cross members 8, 8', 8" fits to the subframe unit 6 (i.e. the "base subframe unit") and the subframe unit 6 fits in turn to the body floor of all vehicles produced on the same platform. Handling and supply of different complete subframes can thus be avoided as it becomes sufficient to provide variants of the cross members/transversal beams that are already equipped with the spring arrangement (typically coil spring, air spring or leaf spring).

A method for manufacturing of a rear wheel suspension system 5 according to what is described above may comprise the steps of:

providing a subframe unit 6 configured to be attachable to a vehicle body structure 5 between first and second rear wheels 2 arranged on opposite sides of the vehicle 1, and further being configured to receive a cross member 8, 8', 8" provided with a spring arrangement 15, 15', 16, 16', 20 for spring suspension of the first and second wheels 2;

providing at least a first and a second cross member 8, 8', 8" configured to be attached to the subframe unit 6, wherein the first cross member is provided with a spring arrangement of a first type (e.g. air springs) and the second cross member is provided with a spring arrangement of a second type (e.g. coil springs) that is different from the first type; and selecting either the first or the second cross member 8, 8', 8" and attaching the selected cross member onto the subframe unit 6.

The method may further comprise the step of attaching the subframe unit 6 with the selected cross member 8, 8', 8" to the vehicle 1.

The invention is not limited by the embodiments described above but can be modified in various ways within the scope of the claims.

The invention claimed is:

1. A system for a wheel suspension of a vehicle, wherein the system is intended to extend in a transversal direction of the vehicle in association with first and second wheels arranged on opposite sides of the vehicle, wherein the system comprises:

a subframe unit provided with a set of attachment points for attachment of the subframe unit to a vehicle body structure, wherein the subframe unit comprises a cross member extending along the subframe unit in the transversal direction of the vehicle when the subframe unit is attached to the vehicle;

at least a first link member arranged on each side of the subframe unit in the transversal direction, wherein each first link member is arranged to connect a corresponding wheel or wheel supporting element with the subframe unit via a pivoted connection; and a spring arrangement arranged to act onto each of the first link members so as to provide for a spring suspension of the first and second wheels, wherein the spring arrangement is arranged onto the cross member so as to act between the cross member and a corresponding first link member, the cross member forms a separate component that is attachable to the subframe unit in a separate production step before attachment of the subframe unit to the vehicle, the subframe unit is adapted for attachment of the cross member of at least a first cross member type and a second cross member type different from the first cross member type, the first cross member type being provided with a spring arrangement of a first type and the second cross member type being provided with a spring arrangement of a second type different from the first spring arrangement type, wherein the cross member attached to the subframe unit is of one of the first and second cross member types, the subframe unit comprises first and second side members connected to each end portion of the cross member, and wherein the subframe unit comprises a connecting member that extends along the subframe unit in the transversal direction of the vehicle when the subframe unit is attached to the vehicle, and wherein the connecting member is connected to the first and second side members so as to hold the first and second side members in place before attaching the cross member, the side members being U-shaped with their convex parts facing each other and a longitudinal center line of the vehicle when the subframe unit is attached to the vehicle.

2. The system according to claim 1, wherein the cross member is detachably attachable onto the subframe unit.

3. The system according to claim 1, wherein the attachment points for attachment of the subframe unit to the vehicle body structure are arranged on the first and second side members.

4. The system according to claim 1, wherein the connecting member extends substantially in parallel with the cross member.

5. The system according to claim 1, wherein the spring arrangement comprises a leaf spring, a coil spring, or an air spring.

6. The system according to claim 1, wherein the spring arrangements of the first and second types are selected from the following group: leaf spring; coil spring;

and air spring.

7. The system according to claim 1, wherein the system comprises first link members of at least two different types adapted to different spring arrangements.

8. The system according to claim 1, wherein the connecting member and the first and second side members are cast so as to form one integral unit.

9. The system according to claim 1, wherein the system is intended to be arranged between left and right rear wheels of the vehicle.

10. A vehicle comprising the system for wheel suspension according to claim 1.

11. A method for manufacturing of a system for a wheel suspension of a vehicle, wherein the method comprises the steps of:

providing a subframe unit configured to be attachable to a vehicle body structure between first and second wheels arranged on opposite sides of the vehicle, and further being configured to receive a cross member provided with a spring arrangement for spring suspension of the first and second wheels, wherein the subframe unit is adapted for receiving of the cross member of at least a first cross member type and a second cross member type different from the first cross member type, the first cross member type being provided with a spring arrangement of a first type and the second cross member type being provided with a spring arrangement of a second type different from the first spring arrangement type, wherein the subframe unit comprises first and second side members connected to each end portion of the cross member, and wherein the subframe unit comprises a connecting member that extends along the subframe unit in a transversal direction of the vehicle when the subframe unit is attached to the vehicle, and wherein the connecting member is connected to the first and second side members so as to hold the first and second side members in place before attaching the cross member, the side members being U-shaped with their convex parts facing each other and a longitudinal center line of the vehicle when the subframe unit is attached to the vehicle;

providing at least the first and the second cross member types configured to be attached to the subframe unit; and selecting either the first or the second cross member type and attaching the selected cross member onto the subframe unit.

12. The method according to claim 11, wherein the method comprises the step of attaching the subframe unit with the selected cross member to the vehicle.

* * * * *